United States Patent [19]
Damm

[11] 3,908,175
[45] Sept. 23, 1975

[54] RADIAL FLOW GAS DYNAMIC LASER
[75] Inventor: Frederick C. Damm, Florencia, Colombia
[73] Assignee: The United States of America as represented by the Secretary of the Air Force, Washington, D.C.
[22] Filed: May 30, 1974
[21] Appl. No.: 474,557

[52] U.S. Cl. ........ 331/94.5 G; 330/4.3; 239/265.11
[51] Int. Cl.² .......................................... H01S 3/22
[58] Field of Search .................... 331/94.5; 330/4.3; 239/265.11

[56] References Cited
UNITED STATES PATENTS
3,842,363  10/1974  Dobrzelecki................. 331/94.5 G

*Primary Examiner*—Robert J. Webster
*Attorney, Agent, or Firm*—Joseph E. Rusz; Arsen Tashjian

[57] ABSTRACT

This unique gas dynamic laser provides outward radial supersonic flow from a toroidal shaped stacked array of a plurality of nozzles, through a diffuser having ring shaped and/or linear shaped vanes, and through a cavity which is cylindrical and concentric with the stacked array, with the resultant laser beam passing through the housing parallel to the central axis of the diffuser which is coincident with the axis of the gas dynamic laser. Therefore, greater beam extraction flexibility is attainable, because of fewer flow shock disturbances, as compared to the conventional unidirectional flow gas dynamic laser in which unidirectional supersonic flow sweeps through a rectangular cavity and is exhausted through a two-dimensional diffuser.

7 Claims, 12 Drawing Figures

US Patent  Sept. 23,1975  Sheet 1 of 4  3,908,175

RADIAL FLOW GAS DYNAMIC LASER

BACKGROUND OF THE INVENTION

This invention relates to the laser art and, more particularly, to a gas dynamic laser.

Gas dynamic lasers which employ a unidirectional gas flow for power extraction, although somewhat recent in advent, are per se well known. Equally well known to persons of ordinary skill in the art is the fact that such lasers have an inherent and severe disadvantage, to wit: the formation of undesired shock planes (and the resultant disturbances) in the cavity which deleterious affect the optical quality of the laser beam that is generated or is amplified. To reduce the severity of this problem, beam passes through the cavity are made which avoid the shocks. However, such preventative action materially reduces the spatial extraction of power, simply because most of the volume of the cavity is wasted. As a result, laser power is nevertheless lost.

My inventive gas dynamic laser eliminates the above-described inherently severe disadvantage, and also eliminates (or at least significantly minimizes) the power loss attributable to the shock-avoiding beam passes conventionally used to reduce the power loss. I do so by teaching an entirely new structure for a gas dynamic laser; and, therefore, I significantly advance the state-of-the-art.

SUMMARY OF THE INVENTION

This invention pertains to a novel gas dynamic laser.

An object of this invention is to teach a radically different gas dynamic laser which allows significantly greater beam extraction flexibility because of fewer shock wave disturbances.

Another object of this invention is to teach the use of a novel toroidal nozzle array to produce a radially-directed, cylindrical supersonic flow field.

Still another object of this invention is to teach a gas dynamic laser the power of which, and the flow rate of which, are independent od the dimension of the laser device, and instead the flow rate of which is proportional to the square of the radius of the nozzle array and/or is linearly related to the preselected height of the nozzle array stack.

These objects, and other equally important and related objects, of this invention will become readily apparent after a consideration of the description of the invention and reference to the drawings.

DESCRIPTION OF THE DRAWINGS

FIG. 10 is a perspective view, in simplified schematic form, of another variation of the preferred embodiment of my invention shown in FIGS. 7 and 8, in which said second variation my novel diffuser component has ring-shaped vanes and resulting circular (i.e., annular) shaped throats; and, FIGS. 11 and 12 are, respectively, the top plan view and the side elevation view, in simplified form, of still another variation of the preferred embodiment of my invention, in which said third variation my novel diffuser component has both ring shaped and vertical (i.e., linear shaped) vanes, resulting in quadrangular shaped throats which may be, for example, rectangular, sqaure, or the like.

DESCRIPTION OF THE PRIOR ART AND OF THE PREFERRED EMBODIMENT

1. As to The Prior Art

As a preliminary matter and in the interest of simplicity, the terminology "gas dynamic laser" will, when used herein, be abbreviated "GDL."

Figure 1:
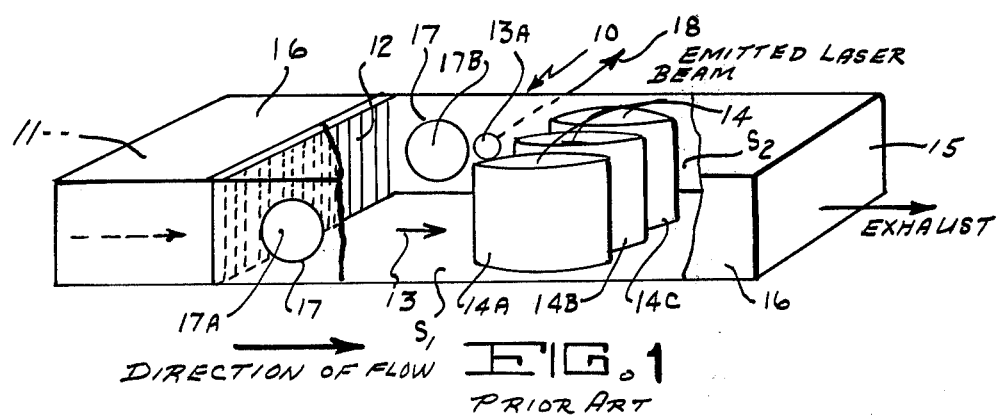
FIG. 1 is a perspective view, in schematic form and partially fragmented, of a typical prior art gas dynamic laser.

With reference to FIG. 1, therein is shown a typical state-of-the-art GDL. It is to be noted and to be remembered that the GDL 10 is assumed to be for use with a source of a gaseous medium (not shown) which is suitable for lasing. These prior art (i.e., conventional) GDLs, such as 10, include as essential components: a combustion chamber 11; a nozzle array 12 having a plurality of slit nozzles in the same plane, with the array downstream of the combustion chamber 11; a rectangular cavity 13, downstream of the nozzle array 12; a two-dimensional diffuser 14 (with vanes, such as 14A, 14B and 14C) downstream of the cavity 13; an exhaust 15 downstream of the two-dimensional diffuser 14; and, a housing 16 to contain the components of the GDL 10. Internal of the rectangular cavity 13 is an optical mirror system 17 with a plurality of mirrors, such as 17A and 17B, by which the created or amplified laser beam, such as 18, eventually is directed and is emitted from and out of the cavity 13 through a cavity opening, such as 13A.

To distinguish these "present day" state-of-the-art GDLs, such as 10, from my unique and novel GDL, I shall hereinafter refer to the former (i.e., the prior art ones) as the "unidirectional flow GDL" and/or more simply as the "unidirectional GDL," since use of any of said prior art GDL always results in a unidirectional supersonic flow (of the gaseous medium used for lasing)

within the rectangular cavity 13, between the planar nozzle array 12 and the two-dimensional diffuser 14.

The arrows in FIG. 1 show the path and the direction of flow of the gaseous lasing medium for combustion to exhaust; the obliquely oriented directional arrow shows the place of egress, and the direction, of the emitted laser beam 18; and, the longitudinally positioned directional arrow, with legend, shows the direction of flow of the gaseous lasing medium.

The manner of operation of these prior art unidirectional GDLS, such as 10, will be described in detail later herein, at which time reference to FIG. 2 will be made.

2. As to The Generic Preferred Embodiment of My Invention

Figure 3:
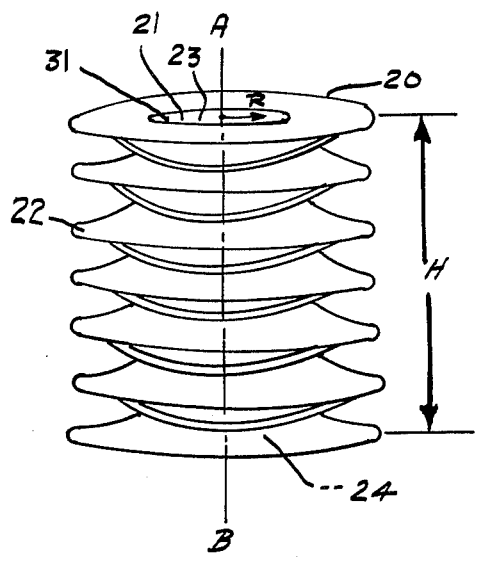
FIG. 3 is a perspective view, in simplified pictorial form, of a preferred embodiment of my novel toroidal nozzle stack (or array) component of my inventive gas dynamic laser.

With reference to FIG. 3, therein is shown one of the major novel components of my invention. More specifically, therein is shown my novel toroidal shaped nozzle stack (or array) 20. The toroidal nozzle stack 20 has a preselected height H, a cylindrical shaped internal surface 21 with a preselected radius R and a central axis A–B, an external surface 22, and at least one inlet, such as 23, although in this case solely as a matter of preference it 22 has two inlets 23 and 24.

Still with reference to FIG. 3, it is to be noted that the cylindrical shaped internal surface 21 of the toroidal nozzle stack 20 forms and defines, in part, the plenum stagnation chamber 31 (or more specifically, the plenum region) portion of the combustion chamber of the combustor.

Figure 4:
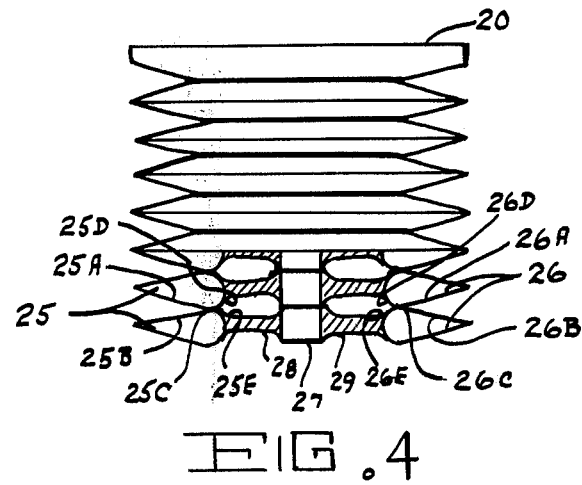
FIG. 4 is a side elevation view, partially in schematic form and partially in cross section, of the preferred embodiment of my toroidal nozzle stack shown in FIG. showing showing greater detail, particularly as to the subsonic contour region, the throat, and the supersonic contour region of said toroidal nozzle stack (or array).

Now, with reference to FIG. 4, therein is another view of my novel toroidal nozzle stack 20 which has been shown in a less detailed view in FIG. 3. The partially cross sectioned view in FIG. 4 shows, as to the toroidal nozzle stack 20 and the area adjacent thereto, in a cutaway portion thereof, two representative nozzles generally designated 25 and 26. Also shown as to each said representative nozzle 25 and 26 are: the supersonic contour thereof (25A and 25B for nozzle 25, and 26A and 26B for nozzle 26); the respective throats thereof (25C for nozzle 25, and 26C for nozzle 26); and, the subsonic contour thereof (25D and 25E for nozzle 25, and 26D and 26E for nozzle 26). Further shown, as a matter of interest, are the nozzle array mount 27 and representative nozzle supports 28 and 29.

Figure 5:
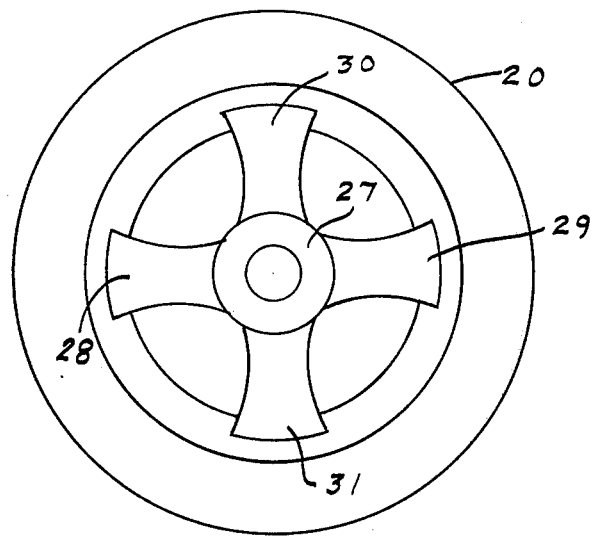
FIGS. 5 and 6 are, respectively, top plan and side elevation views, in detail, of a representative nozzle of the toroidal nozzle stack (or array) shown in FIGS. 3 and 4.
Figure 6:
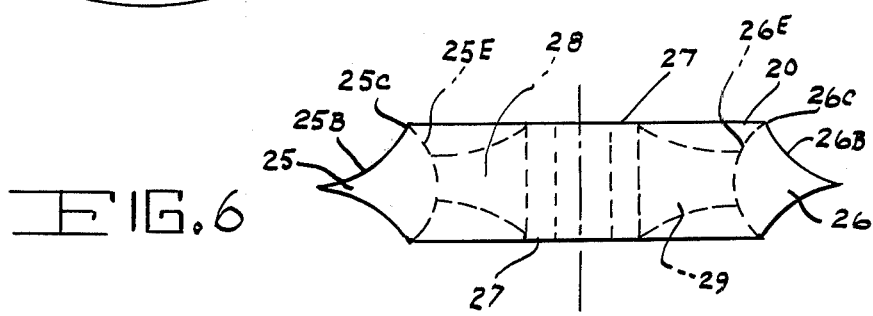

With reference to FIGS. 5 and 6, they show, respectively, a top plan view and a side elevation view of my novel toroidal nozzle stack 20; shown in FIGS. 3 and 4. Shown therein are: the nozzle array mount 27; representative nozzle supports 28, 29, 30 and 31; portions of representative nozzles 25 and 26; the supersonic contours 25B and 26B; portions of the respective throats 25C and 26C; and, the subsonic contours 25E and 26E.

Figure 7:
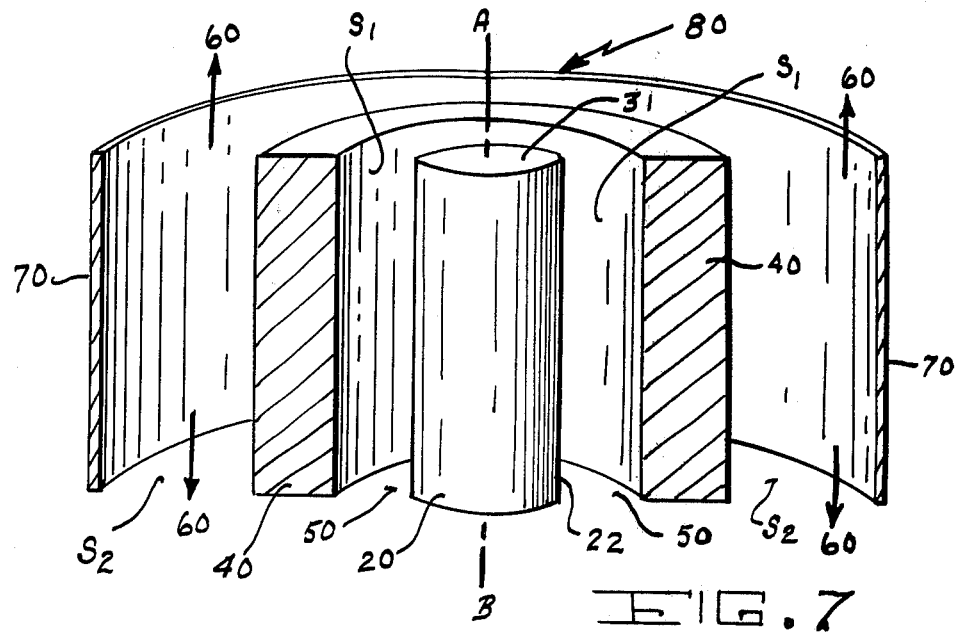
FIG. 7 is a cutaway view, in perspective and in simplified schematic form, of a preferred generic embodiment of my inventive radial (flow) gas dynamic laser.

In FIG. 7 is shown, in simplified schematic form, in cutaway and in cross section, a preferred generic embodiment of my inventive GDL 80. The toroidal nozzle stack 20 is centrally located; the plenum region 31 (of the combustion chamber) internal of the toroidal nozzle stack 20; my novel diffuser 40 surrounding, and in concentric spaced apart relationship with, the external surface 22 of the toroidal nozzle stack 20, resulting in an annular cavity 50 thereby being formed between the diffuser 40 and the external surface 22 of the toroidal nozzle stack 20; a suitable housing 70; and, an exhaust region 60 (having at least one outlet) in communication with the diffuser 40 and located between the diffuser 40 and the housing 70. Also shown in FIG. 7 are: toroidal nozzle stack central axis A–B (which is also the central axis of GDL 70); supersonic region $S_1$; and, subsonic region $S_2$.

Figure 8:
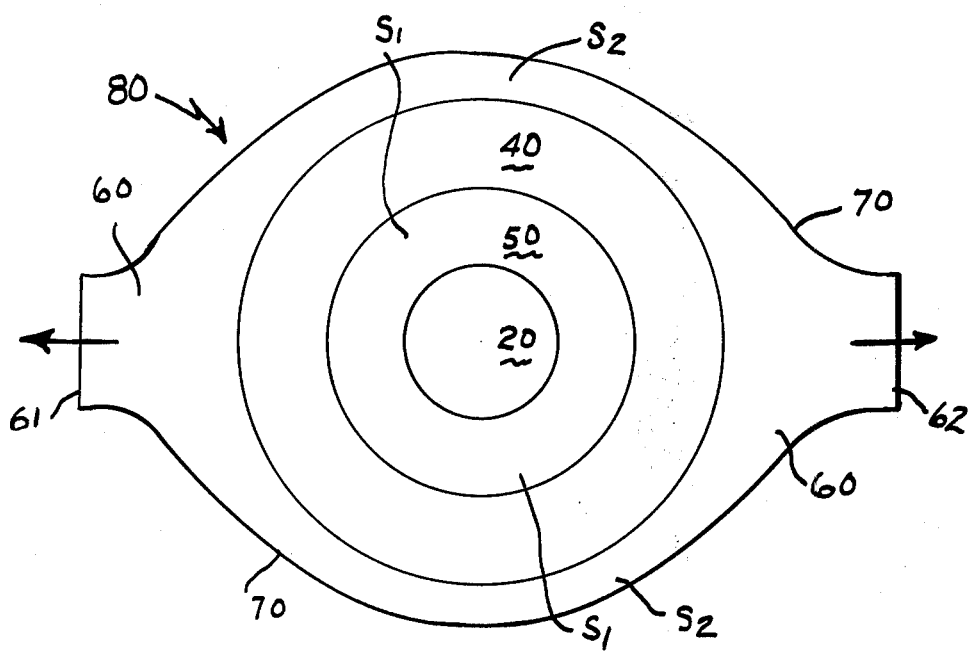
FIG. 8 is a top plan view, in cross section and in simplified schematic form, of the preferred generic embodiment of my invention shown in FIG. 7.

FIG. 8 is a top plan view, in cross section and in simplified schematic form, of the same preferred generic embodiment of my GDL 80 as is shown in FIG. 7. Easily seen, in structural concentric relationship, are: the nozzle array 20; the cavity 50; the diffuser 40; exhaust region 60 with two outlets 61 and 62; and housing 70. It is to be noted that there are two exhaust outlets 61 and 62 shown solely as a matter of preference, since only one exhaust outlet would suffice. Also shown in FIG. 8 are supersonic region $S_1$ and subsonic region $S_2$.

A. As to A Variation of The Preferred Generic Embodiment

Figure 9:
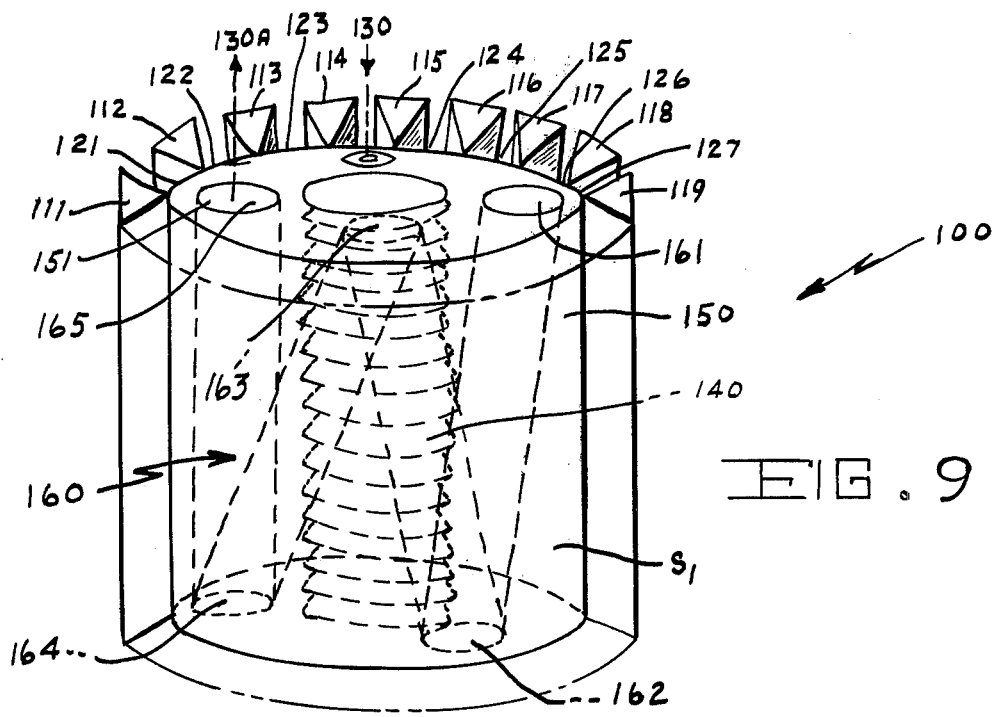
FIG. 9 is a perspective view, in simplified pictorial form, of one variation of the preferred generic embodiment of my invention shown in FIGS. 7 and 8, in which said first variation my novel diffuser component has long vertical (i.e., linear shaped) vanes and resulting long vertical (i.e., linear shaped) throats.

With reference to FIG. 9, therein is shown a perspective pictorial representation of a variation 100 of the preferred generic embodiment of my inventive GDL 80 already shown in FIGS. 7 and 8. In a nut shell, the principal significant structural difference which makes embodiment 100, FIG. 9, a variation is the difference of the diffuser, generally designated 110. In embodiment 100, the diffuser 110 has long vertical (i.e. linear shaped) vanes, such as representative linear vanes 111–119, and resulting long vertical (i.e., quadrangluar or rectangular shaped) throats, such as representative ones 121–127.

Also shown in FIG. 9 are the following components of variation 100 of my GDL: the toroidal nozzle stack 140; the annular cavity 150 with cavity opening or outlet 151; the optical system, generally designated 160, which is located internal of the annular cavity 150, and which said system 160 includes a plurality of suitably positioned mirrors or the like (such as representative one 161–164) which cause vibrational population inversion of the gaseous lasing material that is introduced into cavity 150. In this regard, it is to be noted that cavity opening 151 is an outlet which may, in fact, be a partially transmissive mirror, a totally reflecting mirror with a hole in it, or simply an opening or the like. It is to be noted that inout 130 is a laser beam and that output 130A is an amplified laser beam.

The remainder of the components of my variation 100 can be easily determined and/or surmised by a person of ordinary skill in the art merely by inspection of FIG. 9.

B. As to Another Variation of The Preferred Generic Embodiment

Figure 10:
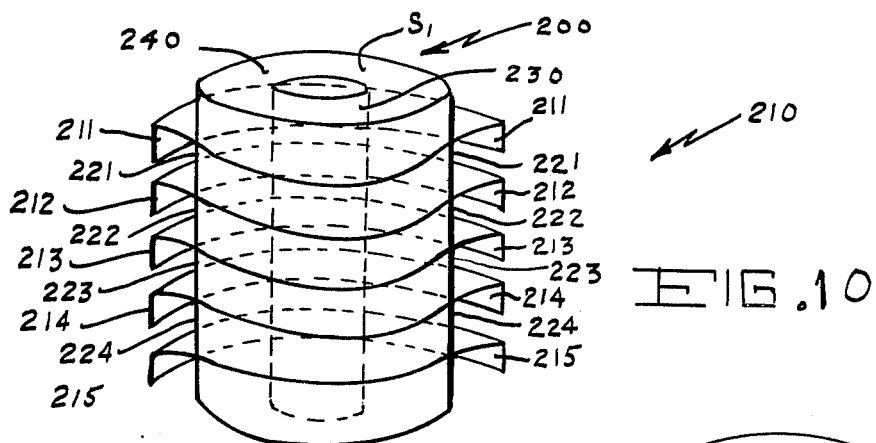

With reference to FIG. 10, therein is shown a perspective view, in simplified schematic form, of another variation 200 of the preferred generic embodiment of my invention GDL 80, shown in FIG. 7 and 8. The principal structural difference is that in variation 200 the diffuser vanes, such as representative ones 211–215, of diffuser 210 are ring (i.e., annular) shaped, with resultant ring (i.e., annular) shaped throats, such as representative ones 221–224.

Also shown in FIG. 10, in order to assist the reader to orient himself as to component positional relationship, are: the toroidal nozzle stack 230; and, the annular cavity 240 with the region of supersonic flow $S_2$ therein.

C. As to Still Another Variation of The Preferred Generic Embodiment

Figure 11:
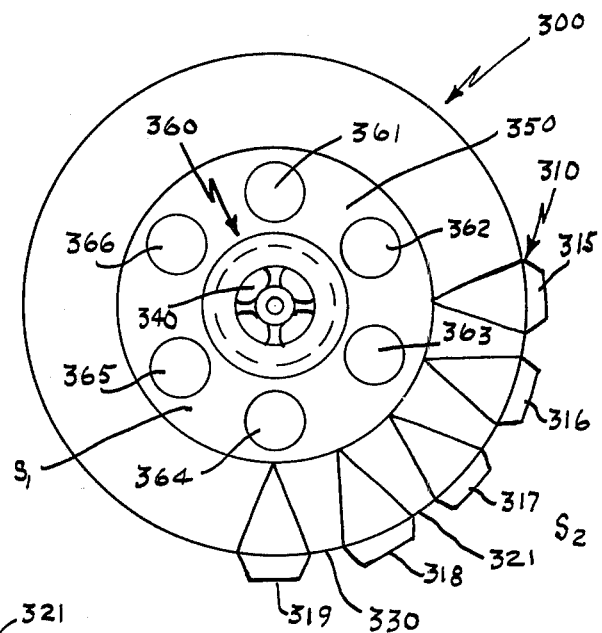
Figure 12:
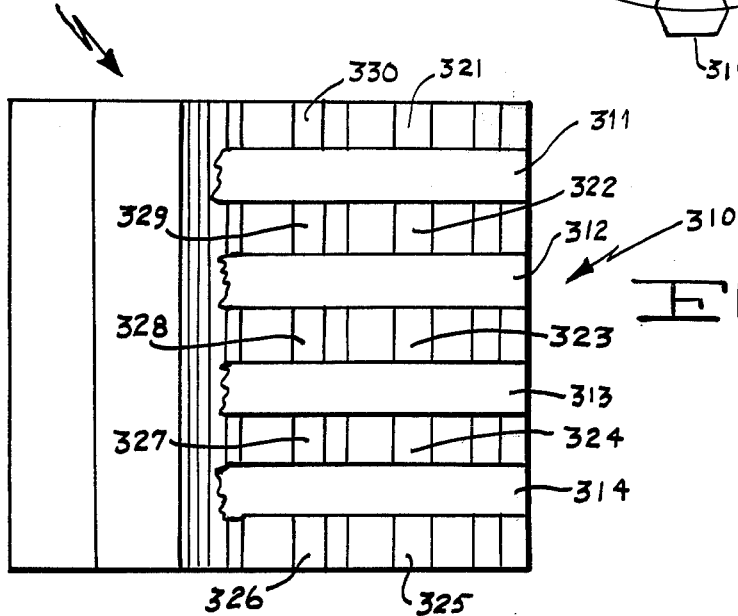

With reference to FIGS. 11 and 12, therein are shown, respectively, the top plan view and the side elevation view of still another variation 300 of the preferred generic embodiment of my inventive GDL 80, shown in FIG. 7 and 8. The principal difference in this variation 300 is that the diffuser 310 includes a plurality of vanes that are ring shaped, such as representative ones 311–314, and a plurality of others that are linear shaped, such as representative ones 315–319, and the use of both simultaneously results in a plurality of quadrangular shaped diffuser throats. It is to be noted that the relative positioning of the ring shaped vanes and of the linear shaped vanes may be arranged so that, among other quadrangular shapes, the resulting throats may be rectangular or square, with square throats being preferred, purely as a matter of choice; and, for illustrative purposes, representative ones are shown in FIG. 12 and are designated 321–330, and two, 321 and 330, are shown also in FIG. 11.

Also shown in FIG. 11, to better orient the reader as to the component positioned relationship of variation 300 as shown in FIGS. 11 and 12, are: the plenum region 340 of the combustion chamber (or combustor); the annular cavity 250 with the supersonic flow region $S_1$ therein; a portion of the optical system 360 internal of the cavity 350, with representative mirrors (or other reflectors) 361–366; and, subsonic flow region $S_2$ external of the diffuser 310.

MANNER OF OPERATION

1. Of The Prior Art GDLs

The manner of operation of the typical prior art unidirectional flow GDL, such as 10, FIG. 1, is obvious from an inspection of FIG. 1, keeping in mind that the region $S_1$ is of supersonic flow and that region $S_2$ is of subsonic flow.

Figure 2:
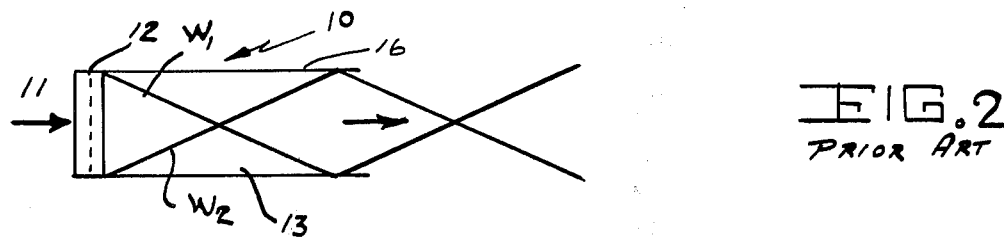
FIG. 2 is a side elevation view, in schematic form and in cross section, of the planar nozzle array, of the cavity, and of a portion of the housing of the typical prior art gas dynamic laser shown in FIG. 1, depicting the undesirable shock plane formation pattern which is invariably created in the cavity of such a prior art laser.

What is not obvious from FIG. 1, and is shown schematically and symbolically in FIG. 2, is the phenomenon of formation of undesired shock planes, and the disturbances resulting therefrom, in the cavity, which said undesirable phenomenon is the inherent result of use of any and all of the state-of-the-art unidirectional flow GDLs.

With reference to FIG. 2, and unidirectional flow GDL 10, FIG. 1, in said FIG. 2 are shown: the stagnation region of the plenum of the combustor (and/or combustion chamber) 11; the planar nozzle array 12; the cavity 13; the GDL housing 16; and, shock waves $W_1$ and $W_2$ which form and constitute a representative shock plane created or otherwise formed inherent to the use of the typical unidirectional flow GDL 10. The shock waves, such as $W_1$ and $W_2$, form a shock wave pattern in the cavity 13 due to the ends of the nozzles which join the upper and lower walls of said cavity 13. These shock waves and their shock planes cause density variations of the gaseous medium which is used as the active lasing material; and, thereby, the optical quality of the resultant laser beam is significantly deleteriously affected.

2. Of My Radial Flow GDL

The manner of operation of my inventive radial flow GDL can be easily ascertained by, a person of ordinary skill in the art, from the foregoing description of my invention, coupled with reference to the Figures, particularly, FIGS. 3–12, inclusive; and, the basically different and entirely new structure of my GDL can be very easily seen by comparing FIGS. 1 and 2 (the prior art) with the above-mentioned FIGS. 3–12, inclusive which depict my unconventional inventive GDL.

Therefore, with reference to FIGS. 3–12, inclusive, as compared to FIGS. 1 and 2, it is fair and accurate to state that, in essence, my inventive GDL provides outward radial (as distinguished from the conventional unidirectional) supersonic flow from a toroidal shaped stacked array of a plurality of nozzles (as distinguished from the conventional planar array of a plurality of nozzles), through a diffuser having ring shaped and/or linear shaped vanes (as distinguished from a two-dimensional diffuser), and through a cavity which is cylindrical (as distinguished from the conventional rectangular one), with the resultant laser beam passing through the housing parallel to (as distinguished from the conventional perpendicular to) the central axis of the diffuser and of the GDL.

In summary, the entirely new, useful, and completely unexpected results achieved by the use of my unconventional GDL include: greather beam extraction flexibility, because of significantly fewer flow shock disturbances; and, unlike the prior art unidirectional flow GDLs, the flow rate of the gaseous medium used for lasing, and thereby the power of the inventive radial flow GDL (or, more precisely, of the laser beam emitted from the inventive radial flow GDL), is proportional to the square of the preselected radius of the cylindrical shaped internal surface of the toroidal nozzle stack, and also is linearly related to the preselected height of the toroidal nozzle stack.

CONCLUSION

It is abundantly clear from all of the foregoing, and from the drawings herein, that the stated desired objects of my invention have been attained.

It is to be noted that, although there have been described the fundamental and unique features of my inventive radial flow GDL as applied to a preferred generic embodiment and three variations thereof, various other embodiments, variations, substitutions, additions, omissions, adaptations, and the like, will occur to, and can be made by, those of ordinary skill in the art, without departing from the spirit of my inventive GDL.

What is claimed is:

1. In a gas dynamic laser, for use with a source of a gaseous medium that is suitable for lasing, having a combustion chamber component connectable to said gaseous lasing medium source, a nozzle array component, comprising a plurality of nozzles each of which has an inlet and an outlet, downstream of and in communication with said combustion chamber component, a cavity component downstream of and in communication with said nozzle array component, a diffuser component downstream of and in communication with said cavity component, an exhaust component downstream of and in communication with said diffuser component, and a housing suitable for containing the aforesaid components, the improvement comprising:

a. a nozzle array component of toroidal shape, with said plurality of nozzles thereof arranged in a stack and forming an external surface and a cylindrical shaped internal surface;

b. a diffuser component surrounding, and in concentric spaced apart relationship with, said external surface of said toroidal shaped nozzle array component;

c. a cavity component of annular type shape between said diffuser component and said external surface of said toroidal shaped nozzle array component;

d. a plurality of suitably positioned mirrors disposed within the annular type shape cavity component between said diffuser component and said external surface of said toroidal shaped nozzle array component;

e. and, a housing having an outlet in that portion thereof which contains said annular type shaped cavity component, to permit an output laser beam emitted by said lasing action of said gaseous medium suitable for lasing, and with said housing also having at least one other outlet located in that portion thereof which contains said exhaust component, to permit the exhaust of the gaseous medium; whereby when said combustion chamber component is connected to a source of gaseous medium that is suitable for lasing, and when said gaseous medium is combusted therein and is subsequently passed through said toroidal shaped nozzle array component, an outwardly radial supersonic flow of the gaseous medium is attained.

2. A gas dynamic laser, as set forth in claim 1, wherein said diffuser includes a plurality of linear shaped vanes arranged about the cavity.

3. A gas dynamic laser, as set forth in claim 1, wherein said diffuser includes a plurality of ring shaped vanes arranged about the cavity.

4. A gas dynamic laser, as set forth in claim 1, wherein said diffuser includes a plurality of both ring shaped vanes and linear shaped vanes arranged about the cavity, thereby forming quadrangular shaped diffuser throats.

5. A gas dynamic laser, as set forth in claim 4, wherein said diffuser ring shaped vanes and said diffuser linear shaped vanes are so arranged about the cavity as to form rectangular shaped diffuser throats.

6. A gas dynamic laser, as set forth in claim 5, wherein said diffuser ring shaped vanes and said diffuser linear shaped vanes are so arranged about the cavity as to form square shaped diffuser throats.

7. A gas dynamic laser, as set forth in claim 1, wherein said housing has an inlet, in that portion thereof which contains the cavity, to permit the entry into the cavity of a laser beam for the purpose of amplifying said laser beam.

* * * * *